United States Patent
Hameed et al.

(10) Patent No.: US 8,344,994 B2
(45) Date of Patent: Jan. 1, 2013

(54) REDUCED ENERGY LET THROUGH MODE INDICATION AND DELAY IN SWITCHING DEVICES

(75) Inventors: Zubair Hameed, Louisville, KY (US); John Steven Holmes, Louisville, KY (US); Stephen James West, Cincinnati, OH (US); Craig Benjamin Williams, Louisville, KY (US); Marcelo Esteban Valdes, Plainville, CT (US)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 12/557,908

(22) Filed: Sep. 11, 2009

(65) Prior Publication Data

US 2011/0063202 A1    Mar. 17, 2011

(51) Int. Cl.
 *G09G 3/36* (2006.01)
(52) U.S. Cl. ............. 345/102; 345/95; 345/99; 345/104
(58) Field of Classification Search .................. None
 See application file for complete search history.

(56) References Cited

U.S. PATENT DOCUMENTS

| | | | | |
|---|---|---|---|---|
| 6,005,757 | A * | 12/1999 | Shvach et al. | 361/64 |
| 6,005,758 | A * | 12/1999 | Spencer et al. | 361/64 |
| 6,734,738 | B2 * | 5/2004 | Ichimaru | 331/14 |
| 7,483,007 | B2 * | 1/2009 | Chen et al. | 345/87 |
| 7,751,165 | B2 * | 7/2010 | Sirivella et al. | 361/62 |
| 2001/0021090 | A1 * | 9/2001 | Benard et al. | 361/9 |
| 2004/0024475 | A1 * | 2/2004 | Berkcan et al. | 700/22 |
| 2005/0047045 | A1 * | 3/2005 | Puskar et al. | 361/115 |
| 2007/0121265 | A1 * | 5/2007 | Hill et al. | 361/62 |
| 2007/0159746 | A1 * | 7/2007 | Sirivella et al. | 361/62 |
| 2008/0074381 | A1 * | 3/2008 | Kumamoto | 345/102 |

OTHER PUBLICATIONS

Eaton, [online]; [retrieved on Jul. 24, 2009]; retrieved from the Internet. http://www.eaton.com/EatonCom/SearchResults/CT_154454.

Eaton Corporation, Arcflash Reduction Maintenance System, Eaton Product Focus, Feb. 2008, Publication No. SA00804001E/TBG00190, USA.

Eaton Corporation, Series G L-Frame Electronic Trip Unit with Arcflash Reduction Maintenance System Molded Case Circuit Breaker, Eaton Product Focus, Mar. 2008, Publication No. PA01200009E/Z6834, USA.

Eaton Corporation, Arcflash Reduction Maintenance System for DigiTrip 10-Series Trip Units, Eaton Product Focus, Jun. 2007, Publication No. PA01301011E/Z5262, USA.

Eaton Corporation, DigiTrip 1150 with Maintenance Mode, Information Sheets, Jul. 2006, Publication No. I.S. 70C1486H01, USA.

Eaton Corporation, Digitrip 520MC with Maintenance Mode, Information Sheets, May 2006, Publication No. I.S. 70C1454H02, USA.

* cited by examiner

*Primary Examiner* — Dismery Mercedes
(74) *Attorney, Agent, or Firm* — Cantor Colburn LLP

(57) ABSTRACT

A method of improved reduced energy let through (RELT) mode selection in a switching apparatus includes receiving a request to disable a RELT mode of the switching apparatus, and, if the RELT mode of the switching apparatus is active, increasing a current threshold of the switching apparatus after a configurable amount of time has elapsed from the receipt of the request to disable the RELT mode.

20 Claims, 3 Drawing Sheets

REDUCED ENERGY LET THROUGH MODE INDICATION AND DELAY IN SWITCHING DEVICES

BACKGROUND OF THE INVENTION

The subject matter disclosed herein relates to switching devices, and more particularly, to reduced energy let through (RELT) mode indication and delay in switching devices.

BRIEF DESCRIPTION OF THE INVENTION

According to an example embodiment, a method of improved reduced energy let through (RELT) mode selection in a switching apparatus includes receiving a request to disable a RELT mode of the switching apparatus, and, if the RELT mode of the switching apparatus is active, increasing a current threshold of the switching apparatus after a configurable amount of time has elapsed from the receipt of the request to disable the RELT mode.

According to another example embodiment, a switching apparatus includes an interrupt portion, a trip unit in communication with the interrupt portion, and a processing device in communication with the trip unit. The processing device configured to perform a method of improved reduced energy let through (RELT) mode selection in a switching apparatus. The method includes receiving a request to disable a RELT mode of the switching apparatus, and, if the RELT mode of the switching apparatus is active, increasing a current threshold of the trip unit after a configurable amount of time has elapsed from the receipt of the request to disable the RELT mode.

According to another example embodiment, a computer readable medium includes computer executable readable instructions that, if executed by a processing device, direct the processing device to perform a method of improved reduced energy let through (RELT) mode selection in a switching apparatus. The method includes receiving a request to disable a RELT mode of the switching apparatus, and, if the RELT mode of the switching apparatus is active, increasing a current threshold of the switching apparatus after a configurable amount of time has elapsed from the receipt of the request to disable the RELT mode.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
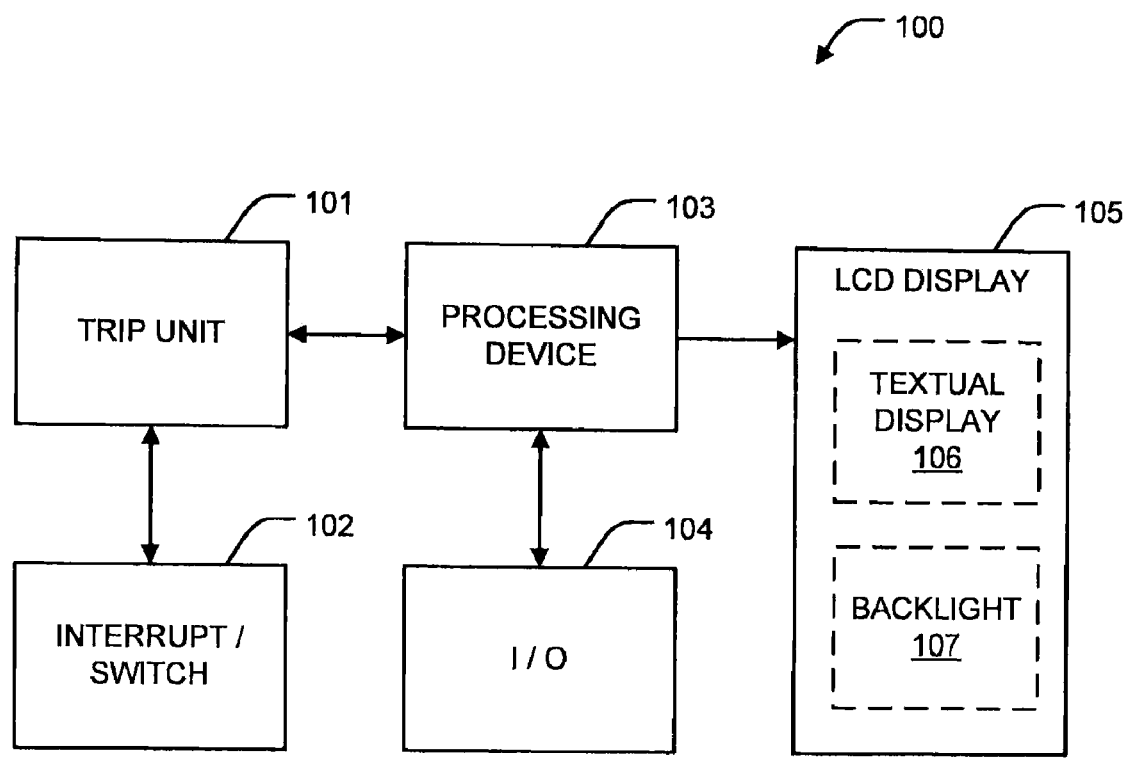
FIG. 1 is a schematic of an example switching apparatus, according to an example embodiment.

The detailed description explains embodiments of the invention, together with advantages and features, by way of example with reference to the drawings.

DETAILED DESCRIPTION OF THE INVENTION

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail.

Example embodiments of the present invention relate to performance features implemented in switching devices controlling current/voltage. For example, Reduced Energy Let Through (RELT) performance features enable a lower current threshold for circuit breakers or other suitable current interrupting devices and switching apparatuses. In switching apparatuses, a Trip Unit may control the switching action of the apparatus based on current traversing the contacts of said apparatus. As the current nears/surpasses a desired current threshold, the Trip Unit directs the contacts to open, thereby opening a circuit and interrupting current flow. If a RELT mode is enabled in the switching apparatus, the Trip Unit may be directed to obey a lower current threshold such that greater performance options may be enabled. For example, if an operator or technician is within the vicinity of a circuit breaker connected to a high voltage/current circuit, it may be desirable to activate RELT modes on these high voltage/current circuit breakers.

It follows, that as example embodiments include switching apparatuses with RELT modes for performance options, it may be desirable for visual indication of an active RELT mode such that an operator or technician understands if a switching apparatus is obeying a lower threshold. Thus example embodiments may include switching apparatuses with Liquid Crystal Displays (LCD) or other visual indicators (e.g., multi-color indicator lights, etc). It can be appreciated that the LCD or other indicators may display a plurality of useful statistics or operational data related to a specific switching apparatus. According to example embodiments, a backlight available for the LCD switching apparatus may be pulsed/modulated/flashed/blinked during an active RELT mode. Additionally, a simplified message or text sequence identifying the RELT mode may be pulsed/modulated/flashed/blinked on a portion of the LCD. This feature is beneficial in that an operator or technician may more easily understand the state of the switching apparatus without having to approach too closely, and the LCD may retain the existing display text while concurrently and effectively indicating an active RELT mode.

According to additional example embodiments, a delay sequence or timer is included in the Trip Unit of an example switching apparatus for exiting a RELT mode.

For example, if RELT mode is activated on a switching apparatus, an indication as described above may be initiated. Upon completion of tasks near the switching apparatus, an operator or technician may desire to disable the RELT mode such that a circuit or system may continue normally and the current threshold may return to normal. However, given that the operator or technician is still within the vicinity of the switching apparatus, and that other circumstances within the circuit may produce undesirable flashes, arcs, or other undesirable conditions if there is a system anomaly, it may be beneficial to introduce a preconfigured or desired delay sequence. According to example embodiments, upon selecting a disable function of a RELT mode of a circuit breaker, the Trip Unit of the switching apparatus may not increase the current threshold until a desired or preconfigured amount of time has lapsed. Thus, an operator or technician may have a given amount of time to exit the vicinity of the switching apparatus before the RELT mode is disabled.

Hereinafter a more detailed explanation of example embodiments is given with reference to the several drawings.

FIG. 1 is a schematic of an example switching apparatus, according to an example embodiment. As illustrated, switching apparatus 100 includes an interrupt/switch portion 102 in operative communication with a trip unit 101. The interrupt/switch portion 102 may include a current sensor with particular, desired, pr preconfigured sensitivity. This sensitivity or multiples thereof may be used in trip point controls of the interrupt/switch portion 102. The trip unit 101 is configured to open the interrupt/switch portion 102 in the event a current flowing across contacts of the interrupt portion 102 exceeds a given or desired threshold (e.g., facilitated through measurements acquired through the current sensor). The switching apparatus 100 further includes a processing device 103 in operative communication with the trip unit 101.

The processing device 103 may include computer executable code portion, that when processed, direct the processing device 103 to execute the methodologies described herein. For example, the processing device 103 may adjust the current threshold of the trip unit such that a RELT mode is appropriately activated. As further depicted, the switching apparatus 100 may include an Input/Output (I/O) interface 104 in operative communication with the processing device 103.

The I/O interface 104 may be any suitable I/O interface including communication ports for electronic communication, buttons, switches, touch-sensitive screens, or any suitable combination thereof (it is noted that this listing is not exhaustive of every suitable I/O interface). The I/O interface 104, for example, may receive a signal or stimulus and direct said signal to the processing device 103. The signal may, for example, be a request for a RELT mode. The signal may also, for example, be a request to exit a RELT mode. Thus, according to any particular signal received, the processing device 103 may direct the trip unit 101 to function accordingly. Furthermore, the I/O interface may be used to transmit signals indicating the state of the switching apparatus 100 externally, in addition to transmitting/receiving any other desired/suitable signal. The switching apparatus 100 may further include a LCD 105 in operative communication with the processing device 103.

The LCD 105 may display a plurality of information regarding the state of the switching apparatus 100 as directed by the processing device 103. For example, the LCD may include a textual display portion 106 and a backlight portion 107.

The textual display portion 106, as directed by the processing device 103, may display a plurality of information regarding the state of the switching apparatus 100 in textual form. For example, textual information display may include trip point setting, ground fault indication, the state of interrupt/switch portion 102, or any other suitable information. Additionally, textual display portion 106 may be useful in selecting additional trip points or configuration settings for the switching apparatus 100, for example, through use of the I/O interface 104.

Figure 2:
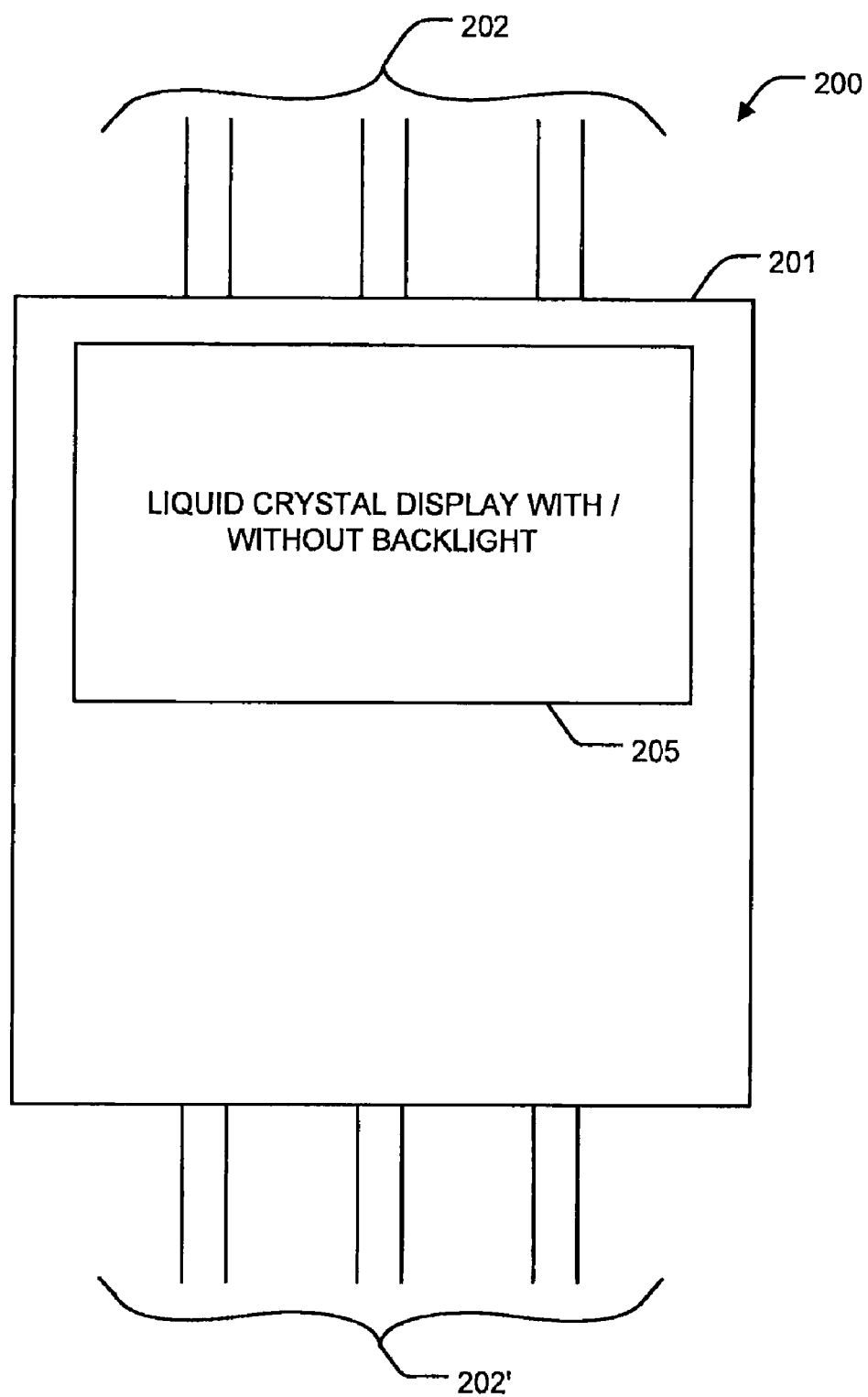
FIG. 2 is a diagram of an example switching apparatus, according to an example embodiment.

The backlight portion 107 may be arranged beneath or behind the textual display portion 106 such that light emitted from the backlight portion 107 illuminates the textual display portion 106 or at least a portion of the LCD 105. The backlight portion 107 may be inoperative communication with the processing device 103 such that the processing device 103 may direct the backlight portion 107 to illuminate on a controlled basis. For example, the processing device 103 may direct the backlight portion 107 to blink/modulate/pulse/flash on a desired basis. It follows that, as described briefly above, if a RELT mode is activated on the switching apparatus 100, the processing device 103 may direct the backlight portion 107 to blink/modulate/pulse/flash in accordance to the methodologies explained with regards to example embodiments. Although particularly illustrated with a backlight portion 107, it should be understood that a switching apparatus may not include a backlight portion. For example, if a switching apparatus does not include a backlight portion, a textual portion of that switching apparatus may blink/modulate/pulse/flash to provide a somewhat similar benefit to the backlight flashing example described briefly above. Turning to FIG. 2, an example switching apparatus is described.

FIG. 2 is a diagram of an example switching apparatus, according to an example embodiment. The switching apparatus 200 may include a housing 201 and a LCD portion 205 supported by the housing 201. The LCD portion 205 may be positioned at any suitable or desired position along the outside of the housing 201, thus the particular placement illustrated should not be construed as limiting. The PCD portion 205 may include a backlight affixed thereto, or conversely, omit a backlight if desired. The switching apparatus 200 may include at least somewhat similar components as these described with regards to FIG. 1 unless particularly stated herein.

As further illustrated, a line feed 202 is directed to the switching apparatus 200 and an interrupt-controlled line out 202' is fed from the switching apparatus 200. For example, the line feed 202 may be terminated at contacts of an interrupt/switch portion of the switching apparatus 200. The interrupt-controlled line out 202' may be terminated at opposite contacts of the interrupt/switch portion of the switching apparatus 200. Thus, if a current flowing through the terminated lines 202-202' exceeds a predetermined or configured threshold, the continuity may be severed through use of the interrupt/switch portion of the switching apparatus 200.

If an RELT mode is activated on the switching apparatus 200, the LCD portion 205 textual display may be modulated, a backlight (if included) may be modulated, or any suitable combination of LCD text/backlight modulation may be performed. Further, if a RELT mode deactivate request is issued, the switching apparatus 200 may enact a predetermined or configured delay before halting modulation and deactivating the RELT mode. Hereinafter, a detailed description of the methodologies of example embodiments is provided with reference to FIG. 3.

Figure 3:
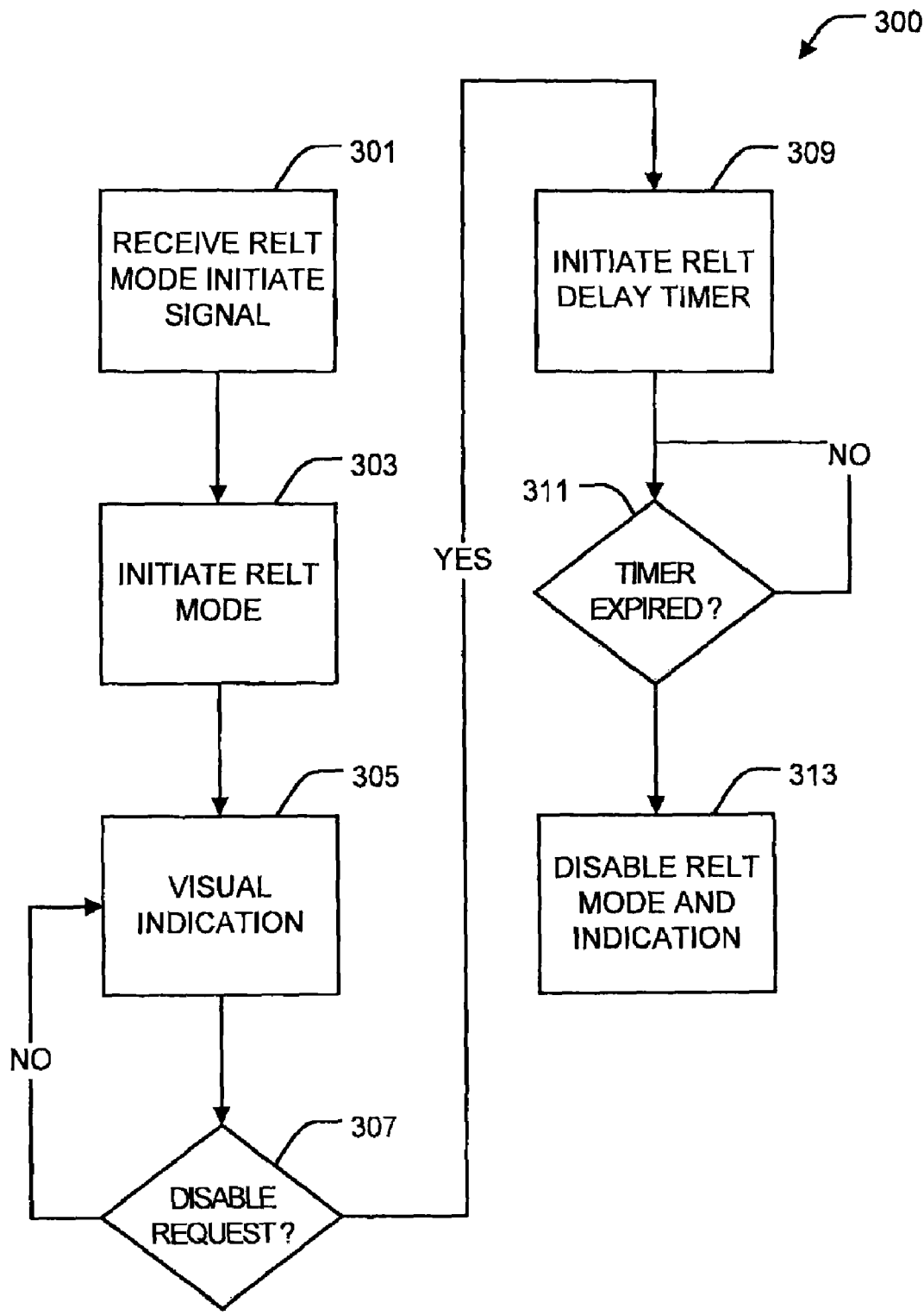
FIG. 3 is a flowchart of a method of indicating and delaying a reduced energy let through mode of a switching apparatus.

FIG. 3 is a flowchart of a method of indicating and delaying a reduced energy let through mode of a switching apparatus. The method 300 includes receiving a RELT mode initiate request at block 301. The RELT mode initiate request may be facilitated through communication with an I/O interface of a switching apparatus as described above, including the use of selection buttons, touch-sensitive displays, and/or remote signals. The method 100 further includes initiating a RELT mode in response to the request at block 303. Initiating the RELT mode may include reducing a trip point in a trip unit of a switching apparatus.

For example, a normal trip point used in an example switching apparatus may be a multiple of about 2 to 47 times a current sensor value (e.g., current sensor on interrupt/switch portion of the example switching apparatus). In contrast, a RELT mode trip point may be a lower trip point, or from about 1 to 10 times the current sensor value. It is noted however, that these values are consistent with an example implementation only as current sensor sensitivities, values, and thresholds vary widely. Thus, wider ranges may be equally suitable in some applications.

The method 300 further includes visually indicating the initiation and execution of the RELT mode at block 305. For example, visually indicating the RELT mode may include any combination of transmitting an output signal from an I/O interface of the switching apparatus, pulsing/modulating/flashing/blinking a textual portion of a LCD of the switching apparatus, and pulsing/modulating/flashing/blinking a backlight portion of the LCD of the switching apparatus (if backlight is included). For example, a processor of the switching apparatus in operative communication with the LCD may direct outputs associated therewith to control the modulation based on the state of the RELT mode. For example, during the entire duration of the RELT mode, and modulation sequence may be enacted such that visual indication effectively conveys the RELT mode active state of the switching apparatus. An example embodiment may include blinking the LCD backlight at one frequency during an active RELT mode (e.g., 1 Hertz) and blinking the LCD backlight at another frequency if a request to exit the RELT mode is received (e.g., 2 Hertz). Furthermore, in response to the request to exit the RELT mode, a countdown display may be initiated on the LCD textual portion such that a time remaining or the delay remaining is displayed on the LCD. The exit request sequence is discussed more fully below.

The method 300 further includes initiating a RELT mode exit delay at block 309 if a RELT mode deactivate request is received 307. For example, a RELT mode deactivate signal may be received at the switching apparatus. In response, a timer or other delay logic may be enacted such that the RELT mode remains active until a predetermined or desired amount of time has elapsed. The predetermined or desired amount of time may be a configurable amount. For example, a suitable range of time may be from about one (1) second to thirty (30) seconds. As discussed above, this time delay value may be displayed in a countdown fashion on the LCD textual display portion. In other example embodiments, the delay may be longer. For example, if there is a distance between a switching apparatus and a safe zone which requires extra delay, the delay may be longer. Furthermore, if a particular application or operator desires more delay, increased delay may be equally suitable. However, according to some example embodiments, the delay may be preconfigured to fifteen (15) seconds. Also, this delay may be fixed in simpler applications if desired. Upon expiration of the timer 311, both the visual indication and RELT mode may be deactivated at block 313. It is noted that either may be deactivated simultaneously, in any sequence, or the visual indication may be deactivated before the timer/delay expires, depending upon any particular implementation. However, the RELT mode should not be deactivated until the desired amount of time has elapsed, which may be indicated by timer expiration or other delay logic.

As briefly noted above, the methodologies described herein may be embodied as computer executable instructions executable by a computer processor or other suitable processing device. The instructions may be stored on/in, for example, a computer readable medium. The computer readable medium may be any form of storage including, but not limited to, computer memory, ROM, RAM, magnetic storage, optical storage, portable storage (e.g., USB drive, thumb-drive, etc), or temporary storage in virtually any form. Furthermore the computer executable instructions may be readily distributed such that existing switching apparatuses may be enabled to enact portions or the entirety of the example embodiments described herein. Furthermore, the computer readable medium may be a medium affixed either temporarily or permanently within a switching apparatus.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of improved reduced energy let through (RELT) mode selection in a switching apparatus, comprising:
   receiving a request to disable a RELT mode of the switching apparatus; and
   if the RELT mode of the switching apparatus is active, initiating a delay of a configurable duration based on the receipt of the request to disable the RELT mode prior to increasing a current threshold of the switching apparatus.

2. The method of claim 1, further comprising:
   receiving a request to enable the RELT mode of the switching apparatus; and
   if the RELT mode of the switching apparatus is not active, reducing a current threshold of the switching apparatus in response to the request.

3. The method of claim 2, further comprising visually indicating the reduced current threshold.

4. The method of claim 3, wherein visually indicating includes at least one of modulating a backlight portion of a liquid crystal display (LCD) of the switching apparatus, and modulating a textual display portion of the LCD.

5. The method of claim 4, wherein modulating the backlight portion of the LCD includes modulating the backlight portion of the LCD at a frequency of one (1) Hertz or two (2) Hertz.

6. The method of claim 3, wherein visually indicating the reduced current threshold includes displaying the elapse of the configurable amount of time on a textual display portion of a liquid crystal display (LCD) of the switching apparatus.

7. The method of claim 1, further comprising outputting a state of the RELT mode of the switching apparatus.

8. The method of claim 1, wherein the configurable amount of time is fixed at a predetermined value.

9. The method of claim 1, wherein the configurable amount of time is preconfigured to fifteen (15) seconds.

10. A switching apparatus, comprising an interrupt portion, a trip unit disposed for communication with the interrupt portion, and a processing device disposed for communication with the trip unit, the processing device disposed and configured to perform a method of improved reduced energy let through (RELT) mode selection of the switching apparatus, the method comprising:
   receiving a request to disable a RELT mode of the switching apparatus; and
   if the RELT mode of the switching apparatus is active, initiating a delay of a configurable duration based on the receiving the request to disable the RELT mode prior to increasing a current threshold of the trip unit.

11. The switching apparatus of claim 10, the method further comprising:
   receiving a request to enable the RELT mode of the switching apparatus; and
   if the RELT mode of the switching apparatus is not active, reducing a current threshold of the trip unit in response to the request.

12. The switching apparatus of claim 11, wherein the method further comprises visually indicating the reduced current threshold.

13. The switching apparatus of claim 12, wherein visually indicating includes at least one of modulating a backlight portion of a liquid crystal display (LCD) of the switching apparatus in communication with the processing device, and modulating a textual display portion of the LCD.

14. The switching apparatus of claim 13, wherein modulating the backlight portion of the LCD includes modulating the backlight portion of the LCD at a frequency of one (1) Hertz or two (2) Hertz.

15. The switching apparatus of claim 12, wherein visually indicating the reduced current threshold includes displaying the elapse of the configurable amount of time on a textual display portion of a liquid crystal display (LCD) of the switching apparatus.

16. The switching apparatus of claim 10, wherein the method further comprises outputting a state of the RELT mode of the switching apparatus at an Input/Output (I/O) interface in communication with the processing device.

17. The switching apparatus of claim 10, wherein the configurable amount of time is fixed at a predetermined value.

18. The switching apparatus of claim 10, wherein the configurable amount of time is preconfigured to fifteen (15) seconds.

19. A non-transitory computer readable storage medium including computer executable instructions that, if executed by a processing device, direct the processing device to perform a method of improved reduced energy let through (RELT) mode selection of a switching apparatus, the method comprising:
   receiving a request to disable a RELT mode of the switching apparatus; and
   if the RELT mode of the switching apparatus is active, initiating a delay of a configurable duration based on the receiving the request to disable the RELT mode prior to increasing a current threshold of the switching apparatus.

20. The non-transitory computer readable storage medium of claim 19, wherein the computer readable medium is in communication with the switching apparatus.

* * * * *